(12) United States Patent
Alder et al.

(10) Patent No.: US 6,915,786 B2
(45) Date of Patent: Jul. 12, 2005

(54) DAMPER FOR A FLUID SYSTEM

(75) Inventors: Randall F. Alder, Fenton, MI (US); David A. Spinweber, Clarkston, MI (US); Nicholas O. Kaltsounis, Rochester Hills, MI (US); Mary Elizabeth Cortese, Troy, MI (US)

(73) Assignee: Dana Corporation, Toledo, OH (US)

( * ) Notice: Subject to any disclaimer, the term of this patent is extended or adjusted under 35 U.S.C. 154(b) by 104 days.

(21) Appl. No.: 10/315,442

(22) Filed: Dec. 10, 2002

(65) Prior Publication Data

US 2004/0107943 A1 Jun. 10, 2004

(51) Int. Cl.$^7$ ................................................ F02M 7/00
(52) U.S. Cl. ....................................... 123/447; 123/456
(58) Field of Search ............................... 123/456, 447; 138/26, 28, 30

(56) References Cited

U.S. PATENT DOCUMENTS

| | | | | |
|---|---|---|---|---|
| 332,402 | A | * | 12/1885 | Leadley ........................ 138/28 |
| 1,304,036 | A | * | 5/1919 | Eshelby ........................ 138/28 |
| 2,841,237 | A | * | 7/1958 | Slayter ........................ 181/252 |
| 4,649,884 | A | | 3/1987 | Tuckey |
| 4,651,781 | A | * | 3/1987 | Kandelman .................. 138/30 |
| 5,088,463 | A | | 2/1992 | Affeldt et al. |
| 5,575,262 | A | | 11/1996 | Rohde |
| 5,617,827 | A | | 4/1997 | Eshleman et al. |
| 5,709,248 | A | * | 1/1998 | Goloff ......................... 138/30 |
| 5,845,621 | A | | 12/1998 | Robinson et al. |
| 5,896,843 | A | | 4/1999 | Lorraine |
| 6,032,651 | A | | 3/2000 | Field |
| 6,148,798 | A | | 11/2000 | Braun et al. |
| 6,205,979 | B1 | | 3/2001 | Sims, Jr. et al. |
| 6,314,942 | B1 | | 11/2001 | Kilgore et al. |
| 6,321,719 | B1 | | 11/2001 | Schwegler |
| 6,418,909 | B2 | | 7/2002 | Rossi et al. |
| 6,463,911 | B1 | | 10/2002 | Treusch et al. |
| 2001/0042538 | A1 | | 11/2001 | Rossi et al. |
| 2002/0043249 | A1 | | 4/2002 | Lee et al. |
| 2003/0111056 | A1 | | 6/2003 | Miandoab et al. |
| 2003/0111057 | A1 | | 6/2003 | Curran et al. |

FOREIGN PATENT DOCUMENTS

| | | |
|---|---|---|
| EP | 1150003 A1 | 10/2001 |
| FR | 1509914 | 1/1968 |
| GB | 2 383 088 A | 6/2003 |

OTHER PUBLICATIONS

Patent Abstracts of Japan for Publication No. 08261101, Publication Date Oct. 8, 1996 (1 page).
European Search Report (3 pages).

* cited by examiner

Primary Examiner—Mahmoud Gimie
(74) Attorney, Agent, or Firm—Rader, Fishman & Grauer PLLC

(57) ABSTRACT

A fluid damper includes a hollow body portion, a first end and a second end. The hollow body portion has a corrugated or shaped outer surface and is filled with a compressible medium. The first and second ends of the damper contact the inner wall of the fluid-carrying line to stabilize the position of the damper within the fluid-carrying line to optimize dampening of the pressure pulsations in the fluid. The damper is formed by extruding or forming the hollow body portion into the desired shape, trimming the hollow body portion to the desired length, crimping and sealing the first and second ends by a heat staking process. The damper can be made from a material or materials that is impermeable and resistant to the fluid within the fluid system. The damper is integrally formed, thereby eliminating welding or manufacturing steps and reducing cost of manufacture.

12 Claims, 3 Drawing Sheets

DAMPER FOR A FLUID SYSTEM

TECHNICAL FIELD

The present invention generally relates to a damper for dampening pressure pulsations of a fluid, and more specifically to a damper for a fuel rail or fuel system component for dampening pressure pulsations in a fuel system of a vehicle.

BACKGROUND OF THE INVENTION

In fuel injection systems, various devices associated with the fuel system may cause pressure waves in the form of pulses to propagate through the fuel system. The pressure waves can be particularly acute within fuel rails of the fuel system. Fluctuations in the pressure within the fuel rail can disrupt the accurate metering of fuel by the fuel injectors. Inaccurate metering of the fuel adversely affects the performance of the engine in that the desired amount of metered fuel will vary with the amount of pressure within the fuel rail. Pressure pulsations within the fuel rail can also cause undesirable noise.

It is known to utilize a damper disposed within the fuel rail to effectively minimize or dampen the pressure pulsations created by the fuel injectors. To form a conventional damper, a ribbon of metal is rolled into a circular tube and welded along the longitudinal seam. After the longitudinal seam is in place, the metallic tube is shaped into an oval or rectangle, cut to the desired length and the ends are sealed by laser or conventional welding. In order to properly secure the damper in place within the fuel rail, wire support members must be attached to the damper. The wire supports are preferably made from stainless steel wire and must be cut to the proper length and shaped before attachment. Finally, the wire support members are clipped or welded onto the flattened ends of the tube. The manufacturing of the damper requires additional steps, making such dampers labor intensive and relatively expensive.

SUMMARY OF THE INVENTION

The inventors of the present invention have recognized these and other problems associated with fluid dampers. To this end, the inventors have developed a fluid system damper that comprises an elongated hollow portion with a first and second end. The elongated hollow portion, first end and second end are of one unitary piece and formed from a material that is preferably impermeable and resistant to the fluid being dampened. The damper is preferably filled with a compressible medium. The hollow body portion has a corrugated surface to improve dampening of the pressure pulsations in the fluid-carrying line. The first and second ends of the damper contact the inner wall of the fluid-carrying line or fluid system so as to stabilize the position of the damper within the fluid-carrying line or fluid system and to optimize the dampening performance of the damper.

In a method of the invention, the first and second ends are heat staked to seal the ends of the elongated hollow portion. The heat staking process allows the damper to be easily and cost effectively manufactured.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
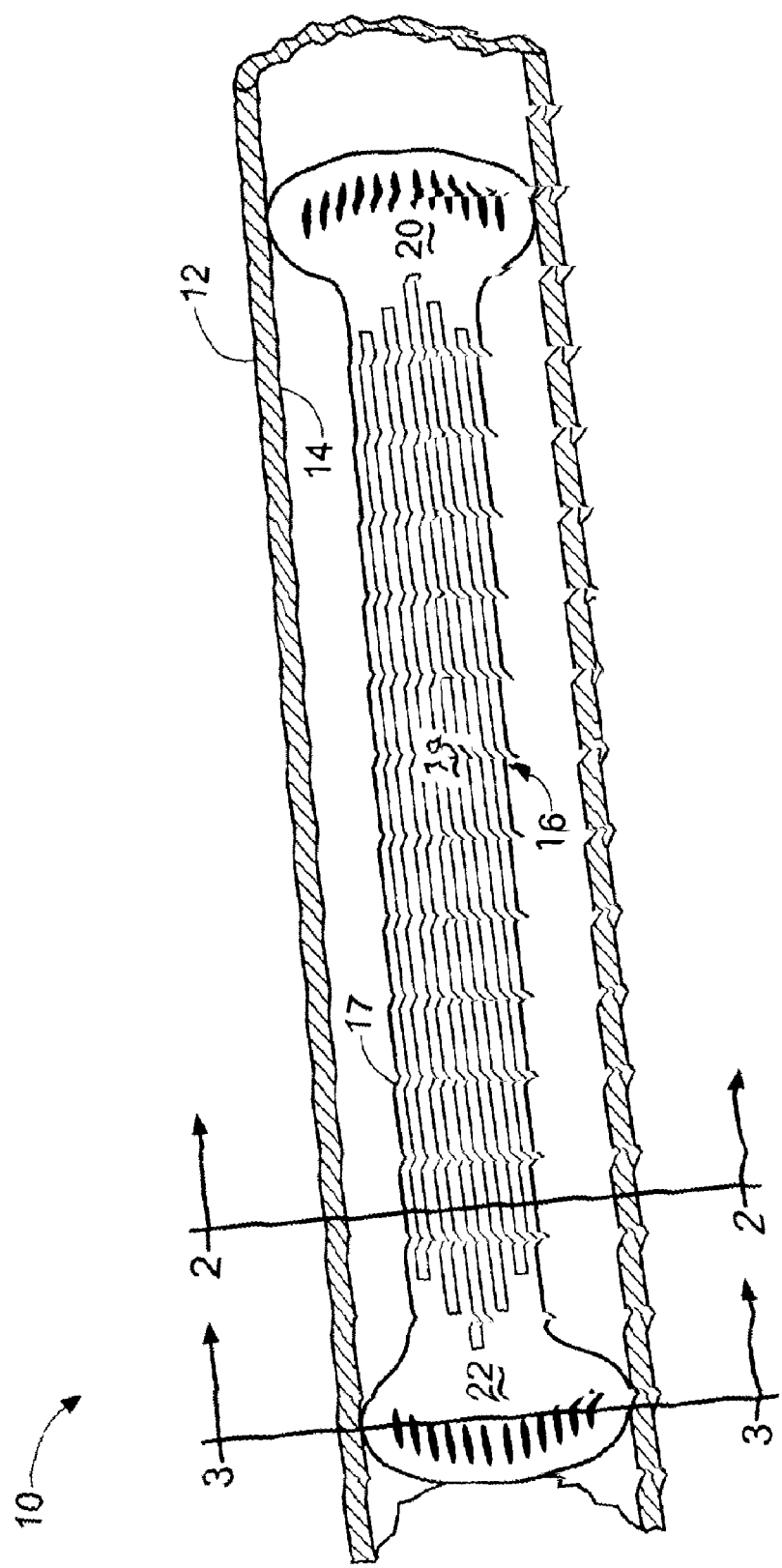
FIG. 1 is a partial cutaway view of a fuel rail, with a damper according to one embodiment of the invention.

Referring now to FIG. 1, a fluid system, generally shown at 10, is shown according to an embodiment of the invention. The fluid system 10 consists of a fluid-carrying line 12 with an inner wall 14, and a damper 16 disposed within the fluid-carrying line 12. In the illustrated embodiment, the damper 16 is tubular with a substantially circular cross-sectional shape. However, it will be appreciated that the invention is not limited by the shape of the fluid-carrying line 12, and that the shape of the damper 16 can be any desired shape to dampen the pressure pulsations in the fluid-carrying line 12. The damper 16 may be designed to extend the entire length of the fluid-carrying line 12.

One application of the principles of the present invention, as illustrated in FIGS. 1–5, is a fuel damper 16 for dampening pressure pulses within a fuel rail 12 of a fuel injection system in a vehicle (not shown). Typically, fuel rails have a length of approximately ten inches and have a diameter of approximately one-half inches for accommodating one or more fuel injector ports (not shown). However, it can be appreciated that the invention is not limited to a fuel damper within a fuel rail and can be practiced in any fluid system that requires a fluid damper to dampen pressure pulsations.

In general, the damper 16 comprises a hollow body portion 18 having a first end 20 and a second end 22. As shown in FIG. 1, the damper 16 is integrally formed from a single piece of material, as described below. In the illustrated embodiment, the hollow body portion 18 is substantially circular in cross-sectional shape to correspond to the cross-sectional shape of the fluid-carrying line 12. However, the cross-sectional shapes of the damper 16 and the fluid-carrying line 12 may be different.

Figure 2:
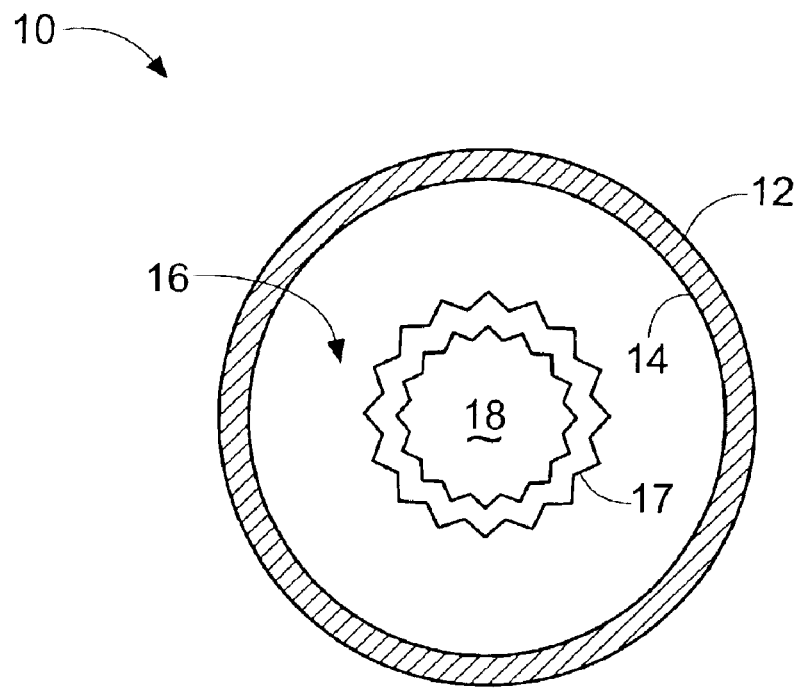
FIG. 2 is a cross-sectional view taken along line 2—2 of FIG. 1.

As shown in FIG. 2, the hollow body portion 18 is tubular or annular with a corrugated outer surface 17. The corrugated surface 17 increases the dampening performance of the damper 16 in dampening pressure pulsations in the fluid-carrying line 12 by increasing the outer surface area of the damper 16 that comes into contact with the fluid within the fluid-carrying line 12, such as fuel, or the like. Second, the corrugated outer surface 17 allows the damper 16 to be made of a material having a greater thickness than a conventional damper without a corrugated outer surface. Specifically, the corrugated outer surface 17 allows the damper 16 to be made of a plastic material, while ensuring that the fluid does not permeate through the material and cause malfunctioning of the damper 16. For a damper made of polytetrafluoroethylene (PTFE), for example, the damper 16 preferably has a thickness in a range between about 1–2 millimeters. Third, the corrugated outer surface 17 allows the damper 16 to expand and/or contract depending on the pressure within the pressurized fluid-carrying line 12. It is the expansion and contraction of the damper 16 that provides dampening of the pressure pulses within the fluid-carrying line 12. However, it can be appreciated that the hollow body portion 18 may have any desired surface finish, depending on the material used to form the damper 16.

Figure 3:
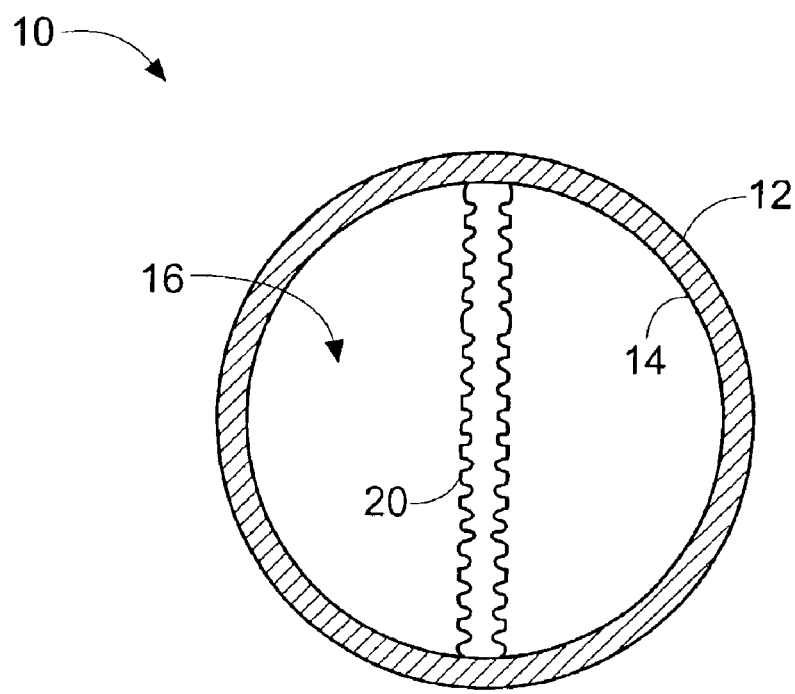
FIG. 3 is a cross-sectional view taken along line 3—3 of FIG. 1.

In the illustrated embodiment of the invention, the first end 20 and the second end 22 are substantially similar in shape. However, it can be appreciated that the first and second ends 20, 22 do not have to be substantially similar in shape. As shown in FIG. 2, the damper 16 is preferably positioned within the fluid-carrying line 12 such that the damper 16 does not move within the fluid-carrying line 12 to provide optimum dampening performance. To stabilize the position and prevent movement of the damper 16 within the fluid-carrying line 12, it is desirable that the first and second ends 20, 22 contact the inner wall 14 of the fluid-carrying line 12, as shown in FIG. 3. To accomplish this, the first and second ends 20, 22 may be flared in a shape of a flange, or the like. It will be appreciated that the first and second ends 20, 22 may be of any desired shape to stabilize the position of the damper 16 within the fluid-carrying line 12.

Figure 4:
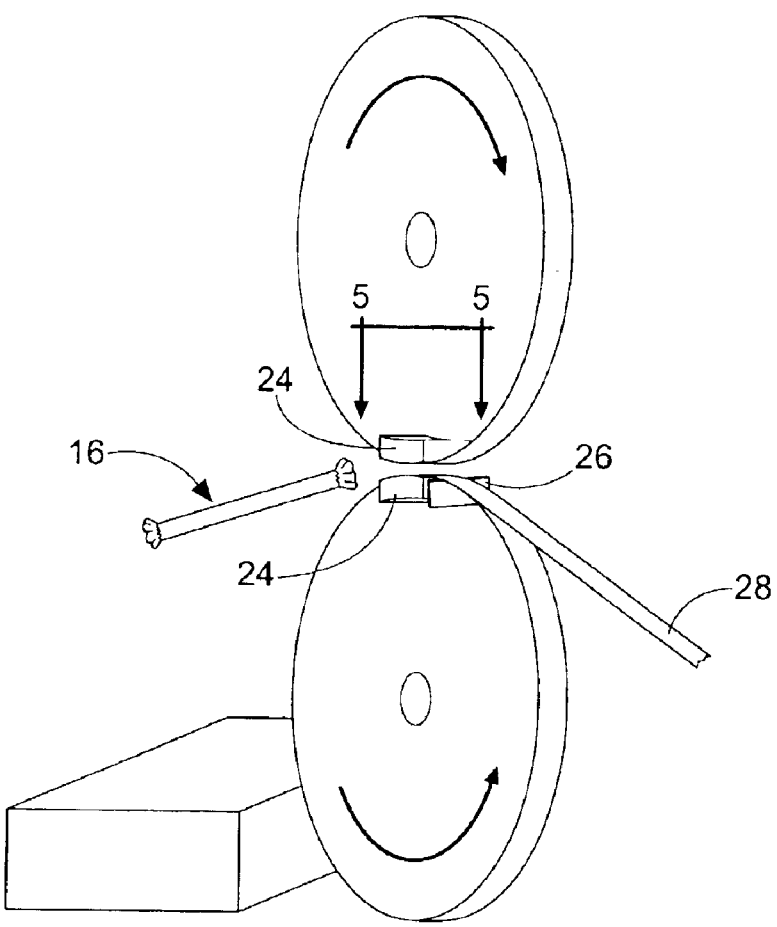
FIG. 4 is a view of the manufacturing tool.
Figure 5:
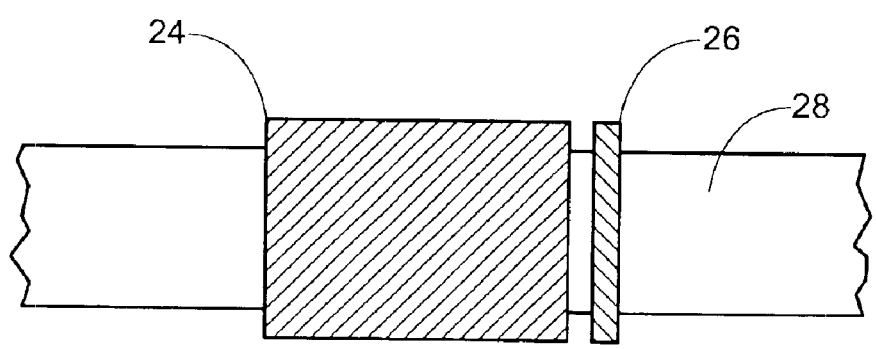
FIG. 5 is a cross-sectional view taken along line 5—5 of FIG. 4.

A method of manufacturing the damper 16 according to the invention will now be described. In the illustrated embodiment, as shown in FIG. 4, the damper 16 is formed by extruding a tube of material 28, such as polytetrafluoroethylene (PTFE), more commonly known as TEFLON®, into the hollow body portion 18. It should be noted that the damper 16 can also be made of more than one material. For example, the damper 16 can be made from a laminated material in which the outer layer is impermeable to the fluid within the fluid line 12. The first and second ends 20, 22 are crimped by a heating element 24 in a heat staking process to form a seal, and the extruded material 28 is then cut by a sharp object, such as a razor 26 according to the desired length for the damper 16, with mating tools as shown in FIGS. 4 & 5. The crimping and sealing of the first and second ends 20, 22 and the cutting of the damper 16 may be accomplished with a single manufacturing step. Because the first and second ends 20, 22 are sealed, the hollow body portion 18 can be filled with a compressible medium, such as a fluid, such as air, or a gel, or the like. Alternatively, the hollow body portion 18 can be filled with a solid, such as a closed-cell or an open-cell foam, or the like. It will be appreciated that the invention is not limited by the medium within the hollow body portion, and that the invention can be practiced with any medium that provides the desired dampening characteristics.

The damper 16 is pressurized above ambient pressure before being inserted into the fluid-carrying line 12. As the second end 22 of the damper 16 is being crimped and sealed, the hollow body portion 18 of the damper 16 experiences a decrease in volume and a resulting increase in pressure. For example, the hollow body portion 18, after being crimped and sealed, may have a pressure of about 20 psi above the ambient pressure. An alternate method of increasing the pressure within the damper 16 is to crimp and seal the first and second ends 20, 22 of the damper 16 within a pressurized chamber (not shown). It should be noted that once pressurized, the damper 16 has a substantially smooth outer surface, as compared to a corrugated outer surface when the hollow body portion 18 is not pressurized. The pressurized damper 16 is then placed in the fluid-carrying line 12 and the fluid-carrying line 12 is then pressurized to a higher pressure than the damper 16. The higher pressure of the fluid-carrying line 12 causes the hollow body portion 18 of the pressurized damper 16 to contract so that the damper 16 forms the desired shape with the corrugated outer surface 17.

It should be understood that the aforementioned and other various alternatives to the embodiments of the invention described herein may be employed in practicing the invention. It is intended that the following claims define the scope of the invention and that the method and apparatus within the scope of these claims and their equivalents be covered thereby.

What is claimed is:

1. A fluid system, comprising:
    a fluid-carrying line including an inner wall; and
    a damper for dampening pressure pulsations within said fluid-carrying line, said damper including a first end, a second end, and a hollow body portion having a longitudinally corrugated outer surface;
    wherein fluid selectively flows between said inner wall of said fluid-carrying line and said corrugated outer surface of said hollow body portion; and
    wherein the corrugated outer surface allows the hollow body portion to expand and contract, thereby dampening the pressure pulsations within the fluid-carrying line.

2. The fluid system in claim 1, wherein said hollow body portion has a first cross-section and at least one of said first end and said second end has second cross-section greater than said first cross-section to locate said damper within said fluid-carrying line.

3. The fluid system in claim 2, wherein said damper is integrally formed of a single material.

4. The fluid system in claim 2, wherein said hollow body portion is filled with a compressible medium.

5. The fluid system in claim 2, wherein said first end and said second end contact the inner wall so as to stabilize a position of said damper within said fluid-carrying line.

6. The fluid system in claim 1, wherein said damper is made of a laminated material having an outer layer made of a material impermeable to a fluid contained within said fluid line.

7. The fluid system in claim 1, wherein said damper is sealed to prevent the flow of fluid within said damper.

8. The fluid system in claim 7, wherein said damper is made of a single layer of material that is impermeable to a fluid contained within said fluid line.

9. The fluid system in claim 8, wherein said single layer of material is plastic material.

10. A fluid system comprising:
    a fluid-carrying line, wherein said fluid line includes an inner wall; and
    a damper having a hollow body portion, a first end and a second end; wherein said hollow body portion, said first end and said second end are integrally formed, said damper having an outer wall; and
    wherein said hollow body portion has a first cross-section and said first end and said second end have a second cross-section greater than said first cross-section to locate said damper within said fluid-carrying line.

11. A method of manufacturing a damper for a fuel rail, comprising the steps of:
    extruding or forming material into a hollow body portion having a corrugated or shaped outer surface;
    cutting the hollow body portion to a desired length; and
    crimping and sealing a first end and a second end to integrally form the damper.

12. The method of claim 11, further comprising the step of inserting the damper into the fuel rail, whereby a pressure of the fuel rail causes the hollow portion of the damper to contract to a desired shape.

* * * * *